(12) United States Patent　(10) Patent No.: US 8,713,222 B2
Ichimura et al.　(45) Date of Patent: Apr. 29, 2014

(54) INFORMATION PROCESSING APPARATUS AND POWER SUPPLY CONTROLLING METHOD

(71) Applicant: Kabushiki Kaisha Toshiba, Tokyo (JP)

(72) Inventors: Tetsunari Ichimura, Ome (JP); Jun Watanabe, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/903,881

(22) Filed: May 28, 2013

(65) Prior Publication Data

US 2013/0262889 A1　Oct. 3, 2013

Related U.S. Application Data

(63) Continuation of application No. 12/634,549, filed on Dec. 9, 2009.

(30) Foreign Application Priority Data

Mar. 24, 2009　(JP) ................................. 2009-072885

(51) Int. Cl.
*G06F 13/12*　(2006.01)
*H01R 24/28*　(2011.01)

(52) U.S. Cl.
USPC ........................................... 710/63; 439/660

(58) Field of Classification Search
USPC ......................................................... 710/63
See application file for complete search history.

(56) References Cited

U.S. PATENT DOCUMENTS 5,539,015 A　7/1996　Horii et al.
5,622,778 A　4/1997　Horii et al.
7,535,666 B2 *　5/2009　Hiratsuka et al. .......... 360/73.03
7,558,899 B2　7/2009　Yip
7,701,701 B2　4/2010　Koo
7,761,647 B2　7/2010　Yang (Continued)

FOREIGN PATENT DOCUMENTS

JP　01-205222　8/1989
JP　11-205412　7/1999

(Continued)

OTHER PUBLICATIONS

Japanese Office Action for application No. 2010-164226 dated May 8, 2012 in 6 pages.

(Continued)

*Primary Examiner* — Titus Wong
(74) *Attorney, Agent, or Firm* — Knobbe, Martens, Olson & Bear, LLP (57) ABSTRACT

According to an aspect of the present invention, there is provided an information processing apparatus including: a first controller configured to control a first external device; a second controller configured to control a second external device; a combo connector configured to connect the first external device to the first controller or to connect the second external device to the second controller alternatively; a first power controller configured to turn OFF buffer power supply of the second controller when the first external device is connected to the combo connector and the second external device is not connected to the combo connector; and a second power controller configured to turn OFF buffer power supply of the first controller when the second external device is connected to the combo connector and the first external device is not connected to the combo connector.

8 Claims, 5 Drawing Sheets

(56) References Cited

U.S. PATENT DOCUMENTS

| | | | |
|---|---|---|---|
| 7,768,776 | B1 | 8/2010 | Szeremeta et al. |
| 7,940,491 | B2 | 5/2011 | Szeremeta et al. |
| 2007/0173121 | A1* | 7/2007 | Chiang .................. 439/609 |
| 2008/0162755 | A1 | 7/2008 | Minami |
| 2008/0189465 | A1 | 8/2008 | Yang |
| 2008/0200072 | A1* | 8/2008 | Cheong .................. 439/660 |
| 2008/0288703 | A1 | 11/2008 | Iyer |
| 2008/0288782 | A1 | 11/2008 | Iyer |
| 2009/0019301 | A1 | 1/2009 | Minami |
| 2009/0055669 | A1 | 2/2009 | Pang et al. |
| 2009/0177808 | A1 | 7/2009 | Park et al. |
| 2009/0210603 | A1 | 8/2009 | Chen et al. |
| 2009/0257184 | A1 | 10/2009 | Lee et al. |
| 2010/0250799 | A1 | 9/2010 | Ichimura et al. |

FOREIGN PATENT DOCUMENTS

| | | |
|---|---|---|
| JP | 2000-357079 | 12/2000 |
| JP | 3148335 | 3/2001 |
| JP | 2006-159753 | 6/2006 |
| JP | 2008-134765 | 6/2008 |
| JP | 2008-165489 | 7/2008 |
| JP | 2008-192123 | 8/2008 |
| WO | WO 2008/043224 A1 | 4/2008 |

OTHER PUBLICATIONS

Hisashi Kobayashi, The world's first USB/Esata Combo Port Loading Note—launching by Japan HP, [Online], Japan, Ascii Corporation, Apr. 11, 2008, [search on Feb. 25, 2010], Internet <URL:http://ascii.jp/elem/000/000/124/124396/>.

IDS Information Sheet.

Information Sheet listing references dated Jun. 6, 2012 in one page.

Japanese Office Action in application No. 2009-072885 in 9 pages.

Toshiba note PC Autumn Winter Model Lineup in 2008, [Online}, Japan, Toshiba Corporation, [search on Feb. 25, 2010].

* cited by examiner

INFORMATION PROCESSING APPARATUS AND POWER SUPPLY CONTROLLING METHOD

CROSS-REFERENCE TO RELATED APPLICATIONS

This application is a continuation of U.S. application Ser. No. 12/634,549, which was filed on Dec. 9, 2009 and which is based upon and claims the benefit of priority from Japanese Patent Application No. 2009-072885, filed Mar. 24, 2009, the entire contents of which are incorporated herein by reference.

BACKGROUND

1. Field

The present invention relates to an information processing apparatus and a power supply controlling method.

2. Description of the Related Art

In general, an information processing apparatus such as a personal computer (PC) includes a USB connector capable of connecting a USB (Universal Serial Bus) cable. The USB connector generally has a metal housing (a so-called shell) and a terminal portion provided in the housing. On the other hand, a tip of the USB cable is provided with a plug (that is, a terminal portion) capable of being put into the housing of the USB connector.

The information processing apparatus is also provided with an interface which is referred to as an eSATA (external Serial Advanced Technology Attachment) interface and can carry out a high speed communication having a data transfer speed between the interface and an external apparatus which is a maximum of 150 MB/second.

In recent years, furthermore, there has been proposed a dual interface apparatus which is compatible for both the USB connector and a connector for the eSATA interface (hereinafter referred to as an eSATA connector).

JP-A-2008-165489 has proposed a storage device capable of selecting a USB interface and an eSATA interface if necessary in a state in which a cable is connected and fixed.

Moreover, JP-A-2008-192123 has proposed a storage device for automatically switching a USB interface and an SATA interface.

As described above, an eSATA device and a USB device are prevented from being connected at the same time by using a shared connector (hereinafter referred to as an eSATA/USB combo connector) of the USB connector and the eSATA connector. More specifically, in the eSATA/USB combo connector, the eSATA device and the USB device can be used alternatively.

Also in the case in which corresponding devices are not connected to an eSATA controller for the eSATA device and a USB controller for the USB device, however, a power is supplied.

Therefore, the power is consumed wastefully.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processing apparatus including: a first controller configured to control a first external device; a second controller configured to control a second external device; a combo connector configured to connect the first external device to the first controller or to connect the second external device to the second controller alternatively; a first power controller configured to turn OFF buffer power supply of the second controller when the first external device is connected to the combo connector and the second external device is not connected to the combo connector; and a second power controller configured to turn OFF buffer power supply of the first controller when the second external device is connected to the combo connector and the first external device is not connected to the combo connector.

An embodiment according to the invention will be described below with reference to the drawings.

First of all, a structure of an information processing apparatus according to an embodiment of the invention will be described with reference to FIGS. 1 to 3. The information processing apparatus is implemented as a notebook type personal computer 100 (hereinafter referred to as a computer 100) which can be driven by a battery, for example.

Figure 1:
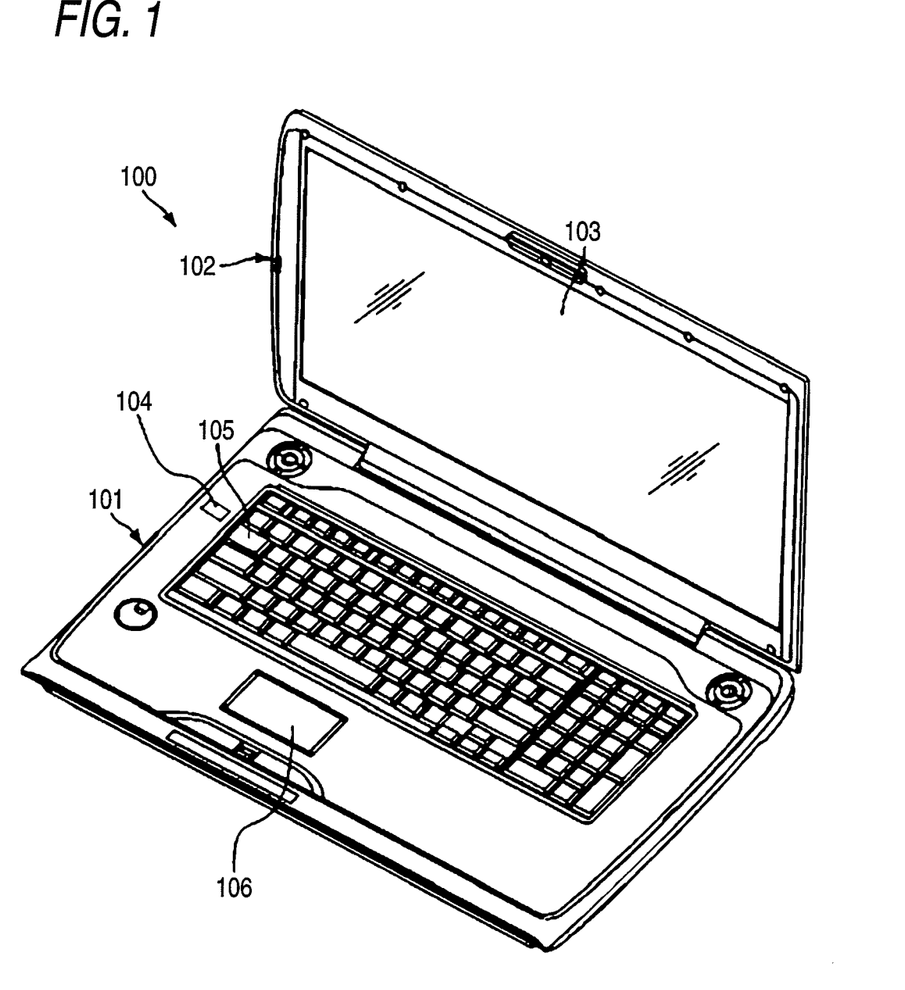
FIG. 1 is an exemplary perspective view showing a front surface of an information processing apparatus according to an embodiment of the invention.

FIG. 1 is a perspective view showing a front surface of the computer 100 in a state in which a display unit is opened. The computer 100 is constituted by a body unit 101 and a display unit 102. A display device constituted by an LCD (Liquid Crystal Display) 103 is embedded into the display unit 102. A display portion of the LCD 103 is disposed on an almost center of the display unit 102.

The display unit 102 is supported on the body unit 101 and is rotatably attached to the body unit 101 between an opening position in which an upper surface of the body unit 101 is exposed and a closing position in which the upper surface of the body unit 101 is covered. The body unit 101 has a housing taking a shape of a thin box, and a power button 104 for turning ON/OFF the computer 100, a keyboard 105 and a touch pad 106 are disposed on the upper surface of the body unit 101. Moreover, a circuit board to be a mother board is accommodated in the housing.

Figure 2:
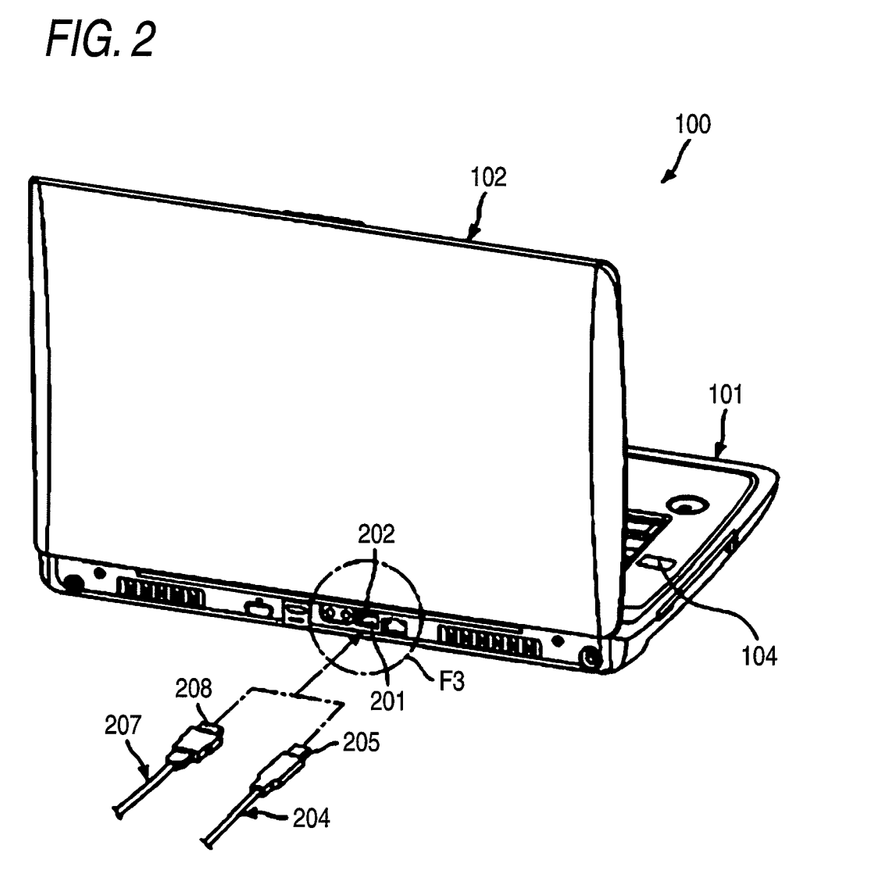
FIG. 2 is an exemplary perspective view showing a rear surface of the information processing apparatus according to the embodiment.
Figure 3:
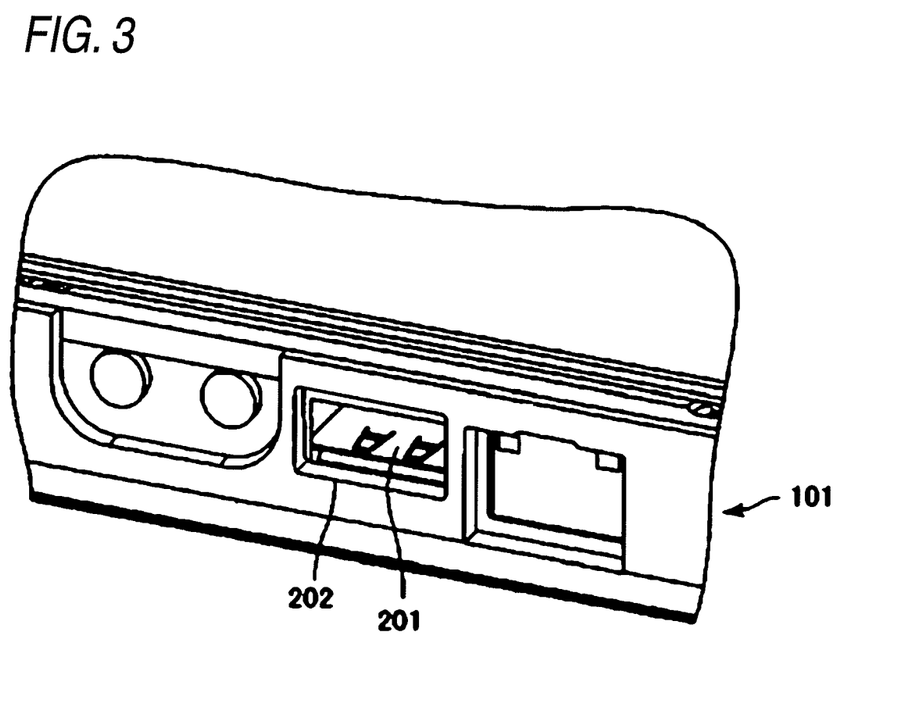
FIG. 3 is an exemplary perspective view showing a region surrounded by an F3 line of the information processing apparatus illustrated in FIG. 2 which is enlarged.

FIG. 2 is a perspective view showing a rear surface of the computer 100 in a state in which the display unit is opened, and FIG. 3 is a perspective view showing a region surrounded by an F3 line in the computer 100 illustrated in FIG. 2 which is enlarged.

As shown in FIGS. 2 and 3, the body unit 101 is provided with a connector 201. In the specification, a connector implies a so-called socket connector which receives a plug of a cable (that is, a terminal portion of the cable).

As shown in FIGS. 2 and 3, moreover, the connector 201 is mounted on the circuit board and is accommodated in the housing, for example. A peripheral wall of the housing is provided with an opening portion 202 which is opposed to the connector 201. The connector 201 is exposed to an outside of the housing through the opening portion 202 and a plug 205 of a USB cable 204 can be put therein from an outside (that is, the USB cable 204 can be connected thereto).

The connector 201 is an eSATA/USB combo connector capable of alternatively connecting both the USB cable 204 and an eSATA cable 207. Accordingly, a plug 208 of the eSATA cable 207 can be put into the connector 201 from the outside in the same manner as the USB cable 204 (that is, the eSATA cable 207 can be connected thereto).

Figure 4:
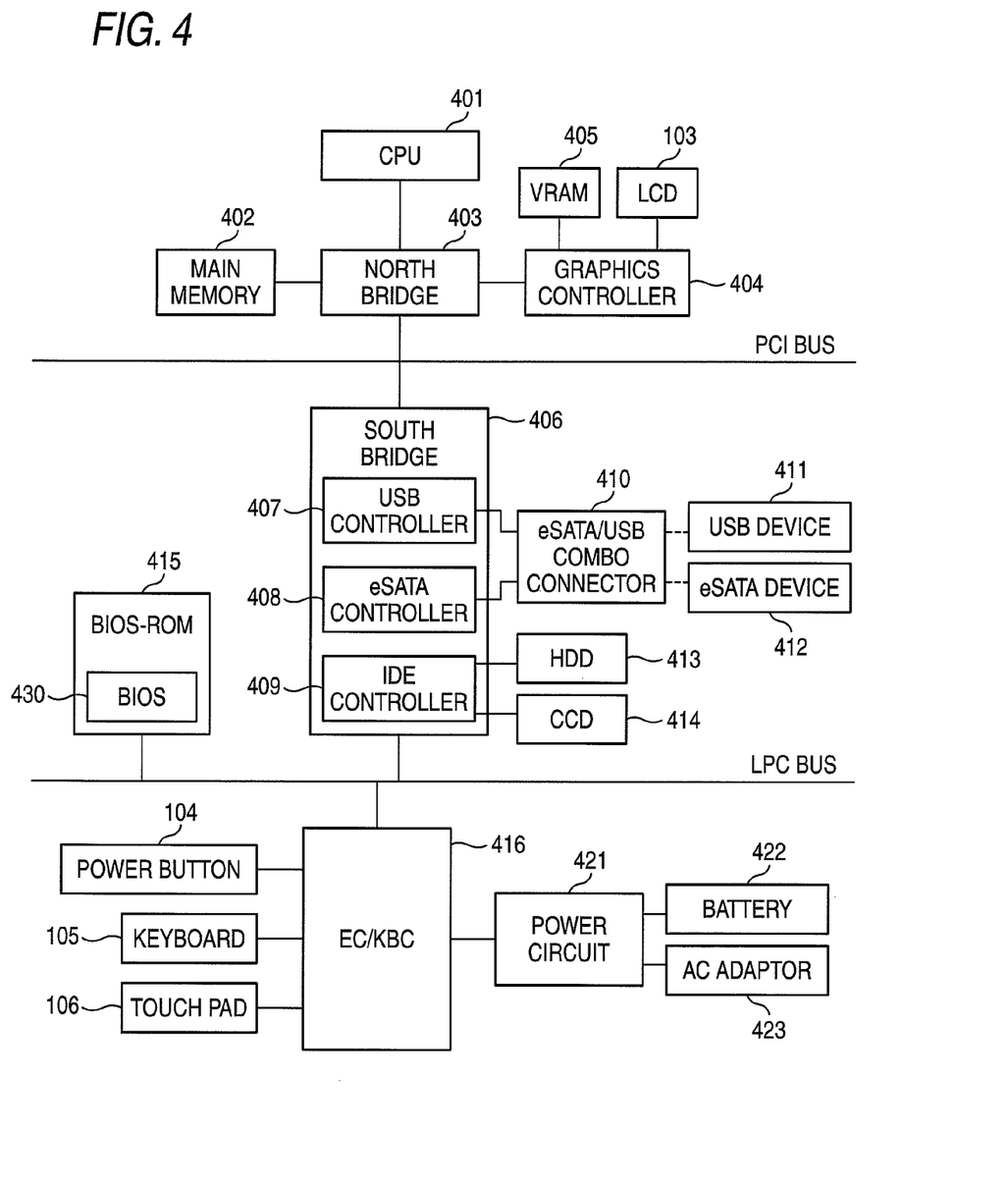
FIG. 4 is an exemplary block diagram showing a structure of a system of the information processing apparatus in FIGS. 1 and 2.

FIG. 4 is a block diagram showing a structure of a system of the computer 100 according to the embodiment.

As shown in FIG. 4, the computer 100 includes a CPU 401, a main memory 402, a north bridge 403, a graphics controller 404, the LCD 103, a VRAM 405, a south bridge 406, a USB controller 407, an eSATA controller 408, an IDE controller 409, an eSATA/USB combo power connector (corresponding to the connector 201 in FIGS. 2 and 3) 410, a USB device 411, an eSATA device 412, a hard disk drive (HDD) 413, an optical disk drive (ODD) 414, a BIOS-ROM 415, the power button 104, the keyboard 105, the touch pad 106, an embedded controller/keyboard controller (EC/KBC) 416, a power circuit 421, a battery 422, and an AC adaptor 423.

The CPU 401 is a processor for controlling a general operation of the computer 100. The CPU 401 executes an OS and various application programs which are loaded into the main memory 402. The OS and the various application programs are stored in a magnetic disk storage medium (a hard disk) provided on the HDD 413 and are loaded from the storage medium into the main memory 402.

Moreover, the CPU 401 also executes a BIOS program 430 stored in the BIOS-ROM 415 (which will be hereinafter referred to as a BIOS). The BIOS-ROM 415 takes a configuration of a nonvolatile memory, for example, a flash EEPROM in such a manner that the program is rewritable.

The BIOS 430 is a program for controlling various hardware components of the computer 100 and is read from the BIOS-ROM 415 when the computer 100 is activated. The BIOS 430 also stores a program for causing the computer 100 to execute a power supply controlling operation according to the embodiment.

The north bridge 403 is a bridge device for connecting a local bus of the CPU 401 to the south bridge 406. The north bridge 403 includes a memory controller for access controlling the main memory 402. Moreover, the north bridge 403 has a function for communicating with the graphics controller 404 through an AGP (Accelerated Graphics Port) bus.

The graphics controller 404 serves to control the LCD 103 to be used as a display monitor of the computer 100. The graphics controller 404 outputs, to the LCD 103, a video signal corresponding to display data written to the VRAM 405 in accordance with the OS or the application program.

The south bridge 406 controls each device on an LPC (Low Pin Count) bus and a PCI (Peripheral Component Interconnect) bus. Moreover, the south bridge 406 includes the USB controller 407 for controlling the USB device 411, the eSATA controller 409 for controlling an eSATA device 412, and the IDE controller 408 for controlling the HDD 413 and the ODD 414.

The eSATA/USB combo connector 410 can alternatively connect either the USB device 411 or the eSATA device 412 to the corresponding controller 407 or 408 as described above. The USB device 411 and the eSATA device 412 can also be connected to the corresponding controllers 407 and 408 through a connector (not shown) which is provided in the computer 100.

The HDD 413 is a storage device having a hard disk controller and a magnetic disk storage medium. Various software including the OS and various data are stored in the magnetic disk storage medium. The ODD 414 is a drive unit for driving a storage medium, for example, a DVD storing video contents such as a DVD title and a CD storing music data.

The EC/KBC 416 is a one-chip microcomputer in which an embedded controller (EC) for a power management, and a keyboard controller (KBC) for controlling the keyboard 105 and the touch pad 106 are integrated. The EC/KBC 416 is always turned ON by a power supplied from the power circuit 421 irrespective of whether the computer 100 is turned ON or OFF. The EC/KBC 416 turns ON/OFF the computer 100 in cooperation with the power circuit 421 in response to an operation of the power button 104 by a user.

The power circuit 421 supplies a power to each device by using a power fed from the battery 422 provided in the body unit 101 or a power fed from external power supply through the AC adaptor 423 under control of the EC/KBC 416.

An operation of the computer 100 having the structure will be described below.

Figure 5:
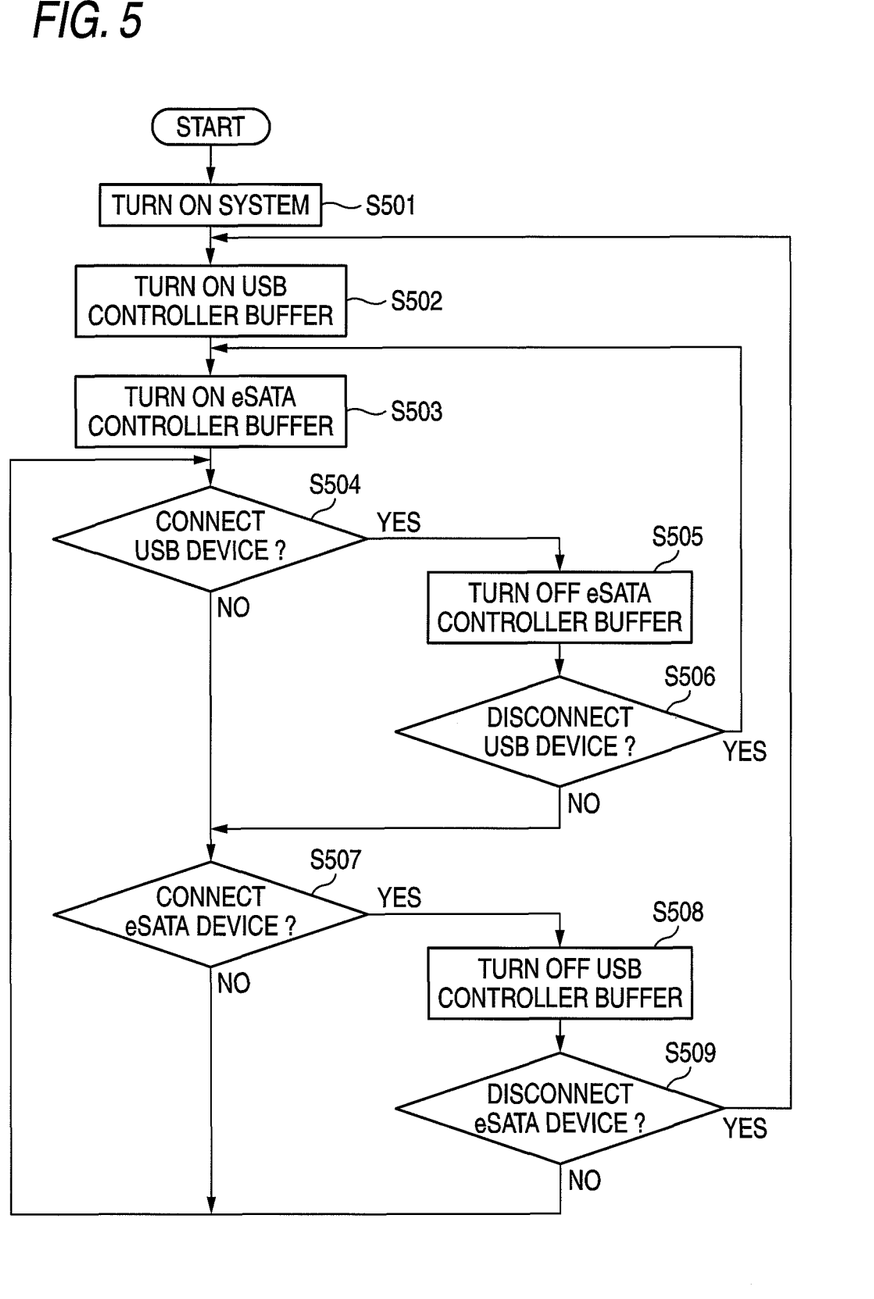
FIG. 5 is an exemplary flowchart showing an example of an operation for discriminating an external device connected to a connector, thereby turning ON/OFF buffer power supply of a controller corresponding to the external device in the information processing apparatus of FIG. 1.

FIG. 5 shows an example of an operation for discriminating an external device connected to the eSATA/USB combo connector 410 and turning ON/OFF the buffer power supply of the controller 407 or 408 corresponding to the external device in the computer 100 according to the embodiment. Moreover, description will be given on the assumption that the USB device 411 and the USB controller 407 will be referred to as a first external device and a first controller respectively, and the eSATA device 412 and the eSATA controller 408 will be referred to as a second external device and a second controller respectively.

When the computer 100 is turned ON (Step S01), the BIOS 430 is first executed by the CPU 401. The following description will include both a state in which the OS of the computer 100 has not been activated and a state in which the OS of the computer 100 has been activated.

Next, the BIOS 430 turns ON buffer power supply of the USB controller 407 (the first controller) (Step S502) and turns ON buffer power supply of the eSATA controller 408 (a second controller) (Step S503).

Then, the BIOS 430 determines whether the USB device 411 (the first external device) is connected or not (via the OS if the OS of the computer 100 is activated) (Step S504).

If it is determined that the first external device is connected (YES in the Step S504), the BIOS 430 turns OFF the buffer power supply of the second controller (via the OS if the OS of the computer 100 is activated) (Step S505). Next, the BIOS 430 determines whether the first external device is disconnected or not (via the OS if the OS of the computer 100 is activated) (Step S506).

If it is determined that the first external device is disconnected (YES in the Step S506), the operation returns to the Step S503 and the processing is repeated.

On the other hand, if it is determined that the first external device is not disconnected (NO in the Step S506), the operation proceeds to Step S507.

If it is determined that the first external device is not connected at the Step S504 (NO in the Step S504), the BIOS 430 determines whether the eSATA device (the second external device) is connected or not (via the OS if the OS of the computer 100 is activated) (Step S507).

If it is determined that the second external device is connected (YES in the Step S507), the BIOS 430 turns OFF the buffer power supply of the first controller (via the OS if the OS of the computer 100 is activated) (Step S508). Next, the BIOS 430 determines whether the second external device is disconnected or not (via the OS if the OS of the computer 100 is activated) (Step S509).

If it is determined that the second external device is disconnected (YES in the Step S509), the operation returns to the Step S502 and the processing is repeated.

On the other hand, if it is determined that the second external device is not disconnected (NO in the Step S509), the operation proceeds to the Step S504.

If it is determined that the second external device is not connected at the Step S507 (NO in the Step S507), the operation proceeds to the Step S504.

In the above flow, order for executing the Steps S502 and S503 may be reversed. Furthermore, order for executing a serial step from the Step S504 to the Step S506 and a serial step from the Step S507 to the Step S509 may be reversed.

In brief, if the first external device is connected to the combo connector and the second external device is not connected to the combo connector, the buffer power supply of the second controller is turned OFF. If the second external device is connected to the combo connector and the first external device is not connected to the combo connector, the buffer power supply of the first controller is turned OFF.

According to the embodiment, therefore, the buffer power supply is turned OFF in the controller on the side where the external device is not connected to the combo connector. Consequently, it is possible to achieve power saving.

If the first external device is not connected to the combo connector and the second external device is not connected to the combo connector, moreover, the buffer power supplies of the first controller and the second controller are turned ON.

Although the description has been given to the embodiment according to the invention, the invention is not exactly restricted thereto but the components can be changed and made concrete without departing from the scope thereof.

For example, although the description has been given to the combo connector capable of alternatively connecting the USB device to the eSATA device in the embodiment, the combo connector is not restricted thereto. More specifically, the information processing apparatus including the connector having the configuration is also included in the scope of the invention if a connector taking the same shape corresponds to a plurality of interfaces.

For example, a controller to turn ON/OFF the buffer power supply of the USB controller 407 and a controller to turn ON/OFF the buffer power supply of the eSATA controller 408 may be commonly implemented on the single physical component (CPU 401). Alternatively, plural physical components may be provided, and each controller may be implemented on the respective one of the processors. Further, plural controllers may be implemented on plural physical components in a distributional manner, and the same controller may be implemented on plural physical components in a duplicated manner.

As described with reference to the embodiment, there is provided an information processing apparatus and a power supply controlling method in which a communication with an external apparatus can be carried out through a shared connector corresponding to different interfaces and supply of a power to controllers corresponding to the interfaces can be controlled to achieve power saving.

What is claimed is:

1. An information processing apparatus comprising:
a processor configured to execute a BIOS and an OS;
a first controller having a buffer and configured to control a first external device through the buffer, the first external device having a USB plug;
a second controller having a buffer and configured to control a second external device through the buffer, the second external device having an eSATA plug; and
a shared connector having:
an opening portion configured to receive both of the USB plug and the eSATA plug in an exclusive manner;
an USB terminal disposed inside the opening portion so as to be connectable with the USB plug being inserted into the opening portion, the USB terminal being connected with the buffer of the first controller; and
an eSATA terminal disposed inside the opening portion so as to be connectable with the eSATA plug being inserted into the opening portion, the eSATA terminal being connected with the buffer of the first controller;
wherein the BIOS operates to:
upon insertion of neither the USB plug nor the eSATA plug into the opening portion of the shared connector, turn ON both the buffer of the first controller and the buffer of the second controller;
upon insertion of the USB plug into the opening portion of the shared connector, turn OFF the buffer of the second controller while leaving the buffer of the first controller turning ON; and
upon insertion of the eSATA plug into the opening portion of the shared connector, turn OFF the buffer of the first controller while leaving the buffer of the second controller turning ON, and
wherein the BIOS controls turning ON/OFF of the buffer of the first controller and the buffer of the second controller via the OS if the OS is activated.

2. The apparatus of claim 1, further comprising:
a first line connecting between the shared connector and the first controller; and
a second line connecting between the shared connector and the second controller.

3. The apparatus of claim 1, wherein the USB plug is a general USB plug, and the eSATA plug is a general eSATA plug.

4. A power supply controlling method for an information processing apparatus comprising a shared connector configured to exclusively receive either a USB plug of a first external device or an eSATA plug of a second external device thereby either connecting the first external device to a buffer of a first controller or connecting the second external device to a buffer of a second controller, the method comprising:
activating a BIOS of the information processing apparatus;
activating an OS of the information processing apparatus;
determining, by the BIOS directly or via the OS if it is activated, whether the USB plug is inserted into the shared connector or the eSATA plug is inserted into the shared connector or neither the USB plug nor the eSATA plug is inserted into the shared connector;
controlling, by the BIOS directly or via the OS if it is activated, power supply to turn ON both the buffer of the first controller and the buffer of the second controller when neither the USB plug nor the eSATA plug is inserted into the shared connector,
controlling, by the BIOS directly or via the OS if it is activated, power supply to turn OFF the buffer of the second controller while leaving the buffer of the first controller turning ON when the USB plug is inserted into the shared connector, and controlling, by the BIOS directly or via the OS if it is activated, power supply to turn OFF the buffer of the first controller while leaving the buffer of the second controller turning ON when the eSATA plug is inserted into the shared connector.

5. The method of claim 4, wherein the USB plug is a general USB plug, and the eSATA plug is a general eSATA plug.

6. A notebook computer comprising:
a processor configured to execute a BIOS and an OS;
a display;
a socket connector mounted on a circuit board and configured to exclusively receive an eSATA plug or a USB plug;
an eSATA controller having a buffer configured to be electrically connectable with the eSATA plug upon insertion of the eSATA plug into the socket connector;
a USB controller having a buffer configured to be electrically connectable with the USB plug upon insertion of the USB plug into the socket connector;
a power circuit configured to respectively supply power to the buffer of the eSATA controller and the buffer of the USB controller; and
a determination module configured to determine whether the USB plug is inserted into the socket connector or the eSATA plug is inserted into the socket connector or neither the USB plug nor the eSATA plug is inserted into the socket connector, wherein the BIOS:

performs power supply to turn ON both the buffer of the USB controller and the buffer of the eSATA controller when neither the USB plug nor the eSATA plug is inserted into the shared connector, performs power supply to turn OFF the buffer of the eSATA controller while leaving the buffer of the USB controller turning ON when the USB plug is inserted into the shared connector, and performs power supply to turn OFF the buffer of the USB controller while leaving the buffer of the eSATA controller turning ON when the eSATA plug is inserted into the shared connector, and wherein the BIOS performs the power supply via the OS if the OS is activated.

7. The notebook computer of claim 6, further comprising:
a first line connecting between the socket connector and the USB controller; and
a second line connecting between the socket connector and the eSATA controller.

8. The notebook computer of claim 6, wherein the USB plug is a general USB plug, and the eSATA plug is a general eSATA plug.

* * * * *